US006045298A

United States Patent [19]

Lytle

[11] Patent Number: 6,045,298

[45] Date of Patent: Apr. 4, 2000

[54] SPRAY INSULATION COMPONENTS

[75] Inventor: C. E. Butch Lytle, Oklahoma City, Okla.

[73] Assignee: Guardian Fiberglass, Inc., Albion, Mich.

[21] Appl. No.: 09/390,310

[22] Filed: Sep. 3, 1999

Related U.S. Application Data

[62] Division of application No. 08/805,729, Mar. 25, 1997, Pat. No. 5,947,646.

[51] Int. Cl.[7] .......................... B65G 53/00; B65G 53/40; B65G 53/50

[52] U.S. Cl. .............................. 406/48; 406/48; 406/122; 406/144; 406/151; 406/153; 406/171; 406/39

[58] Field of Search .................................... 406/39, 48 O, 406/65, 109, 122 C, 124, 144 C, 151 C, 152, 153 C, 163, 171 C, 172, 121

[56] References Cited

U.S. PATENT DOCUMENTS

| | | |
|---|---|---|
| 2,889,083 | 6/1959 | Schwinhorst . |
| 2,890,079 | 6/1959 | Stumpf . |
| 3,210,127 | 10/1965 | Schaben et al. . |
| 3,529,870 | 9/1970 | Woten . |
| 3,861,599 | 1/1975 | Waggoner . |
| 3,995,775 | 12/1976 | Birkmeier et al. . |
| 4,129,338 | 12/1978 | Mudgett . |
| 4,242,007 | 12/1980 | Ogden et al. . |
| 4,249,839 | 2/1981 | Vance . |
| 4,411,390 | 10/1983 | Woten . |
| 4,465,239 | 8/1984 | Woten . |
| 4,572,726 | 2/1986 | Van Abbema . |
| 4,673,594 | 6/1987 | Smith . |
| 4,712,347 | 12/1987 | Sperber . |
| 4,773,960 | 9/1988 | Vincelli et al. . |
| 4,824,295 | 4/1989 | Sharpless . |
| 4,947,903 | 8/1990 | Beckwith . |
| 5,114,281 | 5/1992 | Hartnett et al. . |
| 5,389,167 | 2/1995 | Sperber . |
| 5,393,794 | 2/1995 | Sperber . |
| 5,403,128 | 4/1995 | Thomas . |
| 5,421,922 | 6/1995 | Sperber . |
| 5,507,869 | 4/1996 | Nyberg et al. . |
| 5,590,984 | 1/1997 | Assarsson . |
| 5,788,163 | 8/1998 | Woten et al. . |

OTHER PUBLICATIONS

"Multi–Matic Unisul's Wall Spray System" w/attached drawing "Cellulose Spray Machine", Unisul Inc., Jan. 1996, (Author Unknown).

*Primary Examiner*—Joseph E. Valenza
*Assistant Examiner*—Kenneth W Bower
*Attorney, Agent, or Firm*—Hall, Priddy & Myers

[57] ABSTRACT

A system and corresponding method are disclosed for blowing or spraying loose-fill insulation (e.g. fiberglass) into wall cavities and the like the system including a fiber recovery or recycling subsystem that vacuums up overspray or waste fibers and forwards them back toward the hopper. A fiber collector device having a fiber inlet and outlet is mounted above the hopper, and receives the recovered waste fibers and redistributes them back into the hopper so that they mix with virgin fibers therein. The mix of recovered and virgin fibers is then blown through the blow hose toward a wall cavity or the like to be insulated.

5 Claims, 7 Drawing Sheets

SPRAY INSULATION COMPONENTS

RELATED APPLICATION

This application is a division of application Ser. No. 08/805,729 filed on Mar. 25, 1997, U.S. Pat. No. 5,947,646.

This invention relates to an insulation blowing or spraying system and corresponding method. More particularly, this invention relates to an insulation blowing system, and corresponding method, including means for recovering or recycling waste fibers and reintroducing them back into the system.

BACKGROUND OF THE INVENTION

Blown insulation is commonly used in the construction industry for insulating dwelling walls, floors, and attics. Insulation fibers such as fiberglass, rock wool, and cellulose are blown into cavities or compartments in building structures (both commercial and residential) to provide thermal and/or acoustic insulation.

Systems and methods for blowing/spraying insulation are old and well-known throughout the art. For example, see U.S. Pat. Nos. 5,590,984; 5,403,128; 5,389,167; 4,773,960; 5,421,922; 5,393,794; 4,673,594; 4,712,347; 4,411,390; 3,995,775; and 3,861,599. Certain prior art systems blow insulation into closed cavities (e.g. U.S. Pat. No. 4,712,347) or attics while others spray or blow the loose-fill insulation together with adhesive into vertically extending open wall cavities so that a substantial amount of the insulation is retained therein.

However, a problem that exists in systems that spray/blow insulation into vertically extending open wall cavities is that a certain amount of the sprayed insulation (e.g. oversprayed portions that are shaved off, or portions that are simply not retained in the open cavities between respective wall studs) falls to the floor in front of or proximate the cavity(ies) being insulated. This excess insulation that falls to the floor may represent from about 10–30% of the insulation sprayed in certain instances. Typically, the insulation that falls to the floor in residential environments is gathered up by shovel and reintroduced into the spraying process at the hopper. This method of recycling waste or overspray fiber is burdensome, time consuming, and labor intensive.

U.S. Pat. No. 5,403,128 discloses an insulation recovery system including a vacuum and corresponding return hose for vacuuming up overspray insulation from the floor and conveying same to a vehicle-mounted cyclone separator. The cyclone separator separates much of the recovered insulation from the recovery airstream and forwards it to a standby chamber, from which an auxiliary airlock meters the recycled fibers back into the main airstream where the recycled fibers intermix with virgin fibers being forwarded from the main hopper.

Unfortunately, the system of U.S. Pat. No. 5,403,128 has a number of drawbacks which generally result from the system having been overengineered and having probably been designed mainly for cellulose spraying, although fiberglass and rock wool are mentioned. For example, the system of the ’128 patent includes: (i) two separate chambers/hoppers, one for virgin fibers and one standby for recycled fibers; (ii) two separate airlocks, one for virgin fibers and one associated with a standby chamber for recycled fibers, (iii) a cyclone separator, (iv) multiple rooms or compartments, and (v) the space and power needed for same. This system is overly complicated and would be very expensive for typical residential use. Furthermore, while the system of the ’128 patent may be excellent for spraying wet, highly saturated, cellulose insulation, many of the system’s components that are advantageous, or even believed to be needed, for wet spray cellulose applications, may be burdensome for wet spray fiberglass applications. Cellulose and fiberglass are different animals with different characteristics.

Another commercially available prior art system designed especially for spraying wet cellulose insulation into wall cavities is the Unisul Multi-Matic System. The Multi-Matic includes a vacuum system that recovers excess insulation and returns it to an auxiliary holding hopper, from which it is metered into new virgin fiber forwarded from the main hopper. Again, it has been found that the Multi-Matic, which is excellent for use in cellulose applications where the recovered fibers are highly saturated, is overengineered, and not nearly as efficient when it comes to spraying fiberglass where there is less saturation of the fibers and sometimes a lesser amount of liquid spray utilized. It has been found that the two hoppers and complex metering system of the Multi-Matic are burdensome and overly expensive.

It is apparent from the above that there exists a need in the art for an insulation recycling spraying system, and corresponding method, that is less complex, more easily and cheaply made and/or performed, and especially adaptable to wet spray fiberglass techniques.

It is a purpose of this invention to fulfill the above-described needs in the art, as well as other needs which will become apparent to the skilled artisan from the following detailed description of certain embodiments of this invention.

SUMMARY OF THE INVENTION

Generally speaking, this invention fulfills the above-described needs in the art by providing a system for blowing loose-fill insulation into wall cavities or the like, the system comprising:

- a hopper for receiving virgin insulation fibers;
- means for introducing the virgin fibers from the hopper into a blowing hose;
- means for blowing the virgin fibers through the blowing hose and out of a nozzle member attached to an end thereof into wall cavities or the like;
- fiber recovery means, including a vacuum operatively associated with a return hose, for recovering waste insulation fibers and conveying the waste fibers back toward the hopper via the return hose;
- collector means, mounted at an elevation vertically above the hopper, for receiving the waste fibers from the fiber recovery means and distributing the waste fibers back into the hopper via gravity so that the waste fibers fall downward from the collector means back into the hopper, wherein the collector means is in fluid communication with the return hose; and
- means for reintroducing the waste fibers that have fallen into the hopper from the collector means back into the blowing hose along with virgin fibers, so that the recovered waste fibers intermix with the virgin fibers in the hopper and the virgin and recovered fibers are together blown into wall cavities or the like to be insulated.

In certain preferred embodiments, the insulation fibers include loose-fill fiberglass mixed with a dry adhesive, and the system includes means for blowing the fiberglass and dry adhesive together with an adhesive activating liquid into the cavities.

This invention still further fulfills the above-described needs in the art by providing a fiber recovery and distribution device for use in an insulation blowing system that includes a fiber recovery or recycling subsystem, the fiber recovery and distribution device comprising:

substantially continuous sidewall means defining and laterally surrounding an interior fiber recovery cavity;

fiber inlet means defined in the sidewall means for receiving recovered insulation fibers from a return hose and allowing the recovered fibers to flow into the cavity;

a top wall disposed adjacent an upper edge of the sidewalls means, the top wall including aperture means defined therein for enabling air flowing from the return hose into the cavity to at least partially exhaust upward through the aperture means; and outlet means located proximate a bottom of the device for allowing recovered fibers to fall from the cavity downward toward and into a hopper.

This invention still further fulfills the above-described needs in the art by providing a method of blowing a loose-fill insulation and dry adhesive mixture together with an adhesive activating liquid into a vertically extending open wall cavity, the method comprising the steps of:

feeding a virgin mixture of loose-fill insulation and dry adhesive into a hopper, and forwarding the virgin mixture from the hopper to a blow hose;

blowing the virgin mixture of loose-fill insulation and dry adhesive from the blow hose together with the adhesive activating liquid into the vertically extending open wall cavity so that a first portion of the blown mixture is retained in the cavity and a second portion of the blown mixture falls to a floor located beneath or proximate the cavity;

vacuuming up the second portion of the mixture from the floor and forwarding the vacuumed up second portion back toward the hopper through a return hose;

receiving the vacuumed up second portion from the return hose in a cavity defined within a collector housing that is mounted at an elevation vertically above and over top of the hopper, the collector housing having an inlet and an outlet defined therein;

allowing the received second portion to fall from the cavity, through the outlet, and into the hopper and intermix with virgin mixture within the hopper; and blowing virgin mixture, together with the recycled second portion that has fallen from the cavity into the hopper, through the blow hose and into the open wall cavity (ies) to be insulated.

This invention will now be described with respect to certain embodiments thereof, accompanied by certain illustrations, wherein:

IN THE DRAWINGS

DETAILED DESCRIPTION OF CERTAIN EMBODIMENTS OF THIS INVENTION

Figure 1:
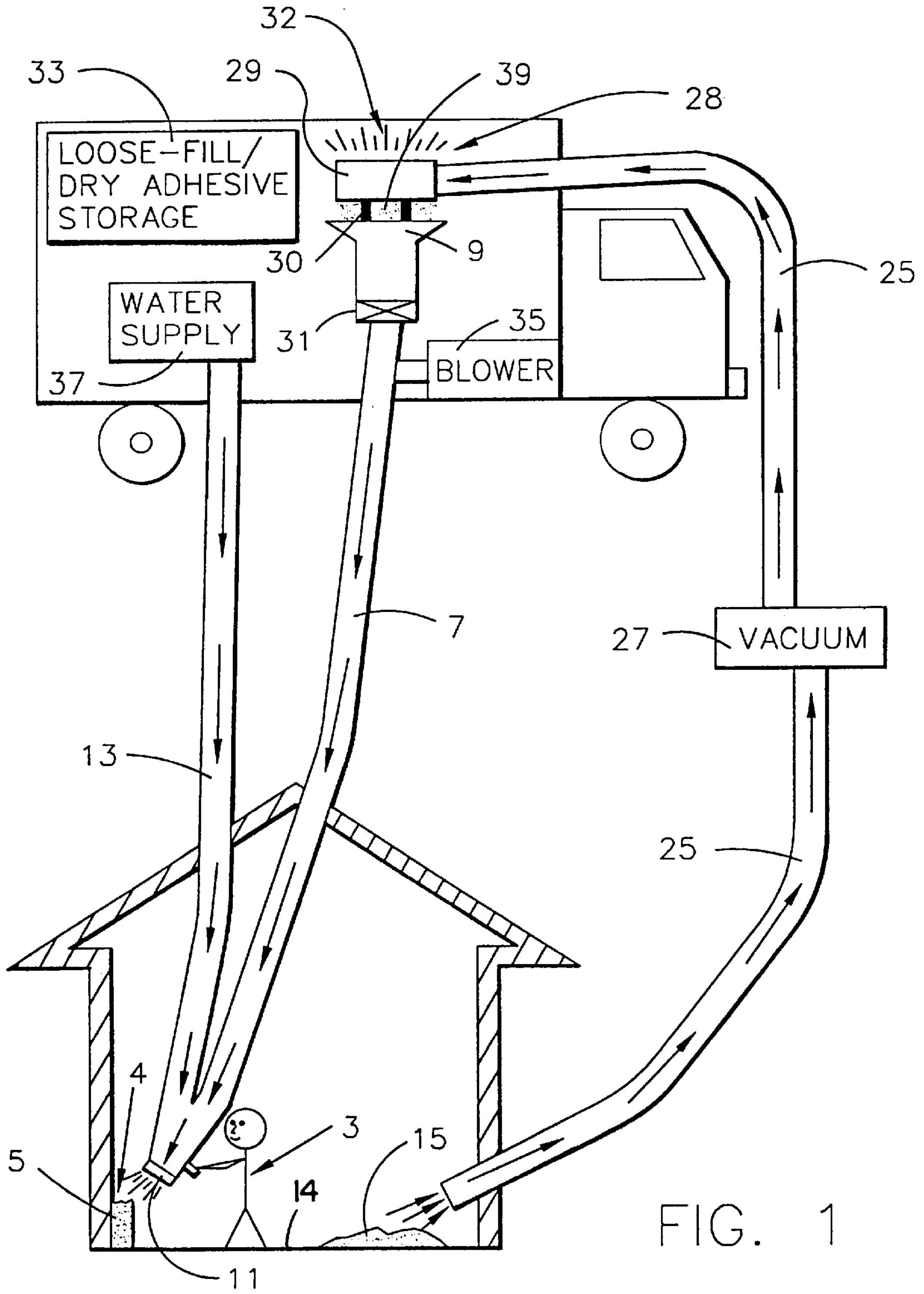
FIG. 1 is a schematic illustrating an insulation blowing/spraying system according to certain embodiments of this invention, the system including a fiber recovery or recycling subsystem.

Referring now more particularly to the accompanying drawings in which like reference numerals indicate like parts throughout the several views.

Figure 2:
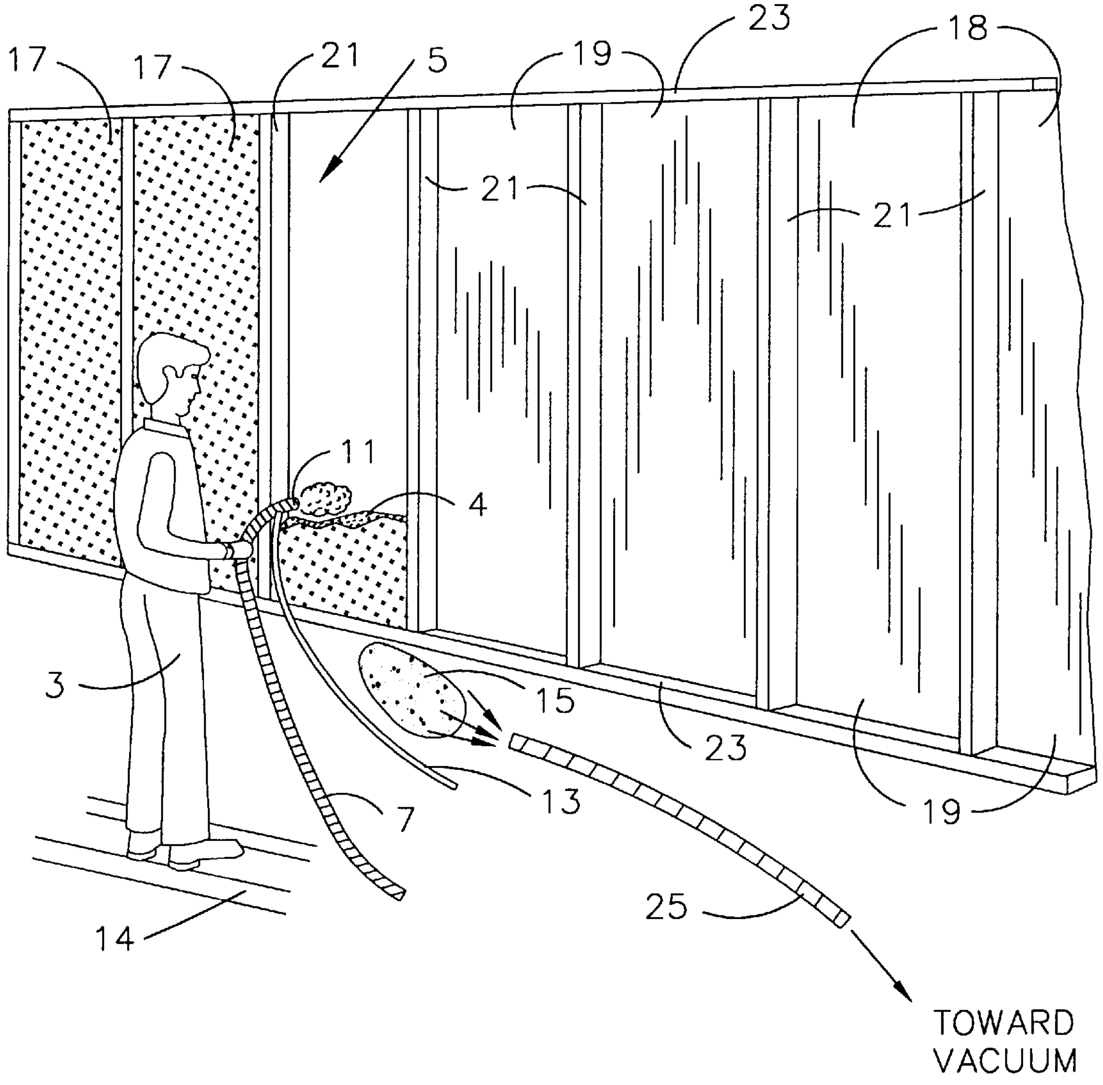
FIG. 2 is a perspective view illustrating a user blowing a loose-fill insulation/dry adhesive mixture together with an adhesive activating liquid into a vertically extending residential open wall cavity according to an embodiment of this invention.

FIGS. 1–2 illustrate user 3 blowing a loose-fill insulation/dry adhesive mixture 4 together with an adhesive activating liquid (e.g. water) into vertically extending open wall cavity 5 according to an embodiment of this invention. As shown, a dry mixture of loose-fill insulation fibers (e.g. fiberglass or cellulose) and dry adhesive (e.g. dry redispersible powder adhesive such as RP 238 available from Air Products) is blown through hose 7 from the outlet of fiber hopper 9 toward nozzle 11. Near or proximate spray nozzle 11, the dry insulation/adhesive mixture is hit with water from hose 13. The insulation/adhesive mixture 4 is blown together with the adhesive activating water into open wall cavity 5. A substantial portion of the blown mixture is retained in the vertically extending cavity, while another smaller portion 15 of the mixture falls to the floor 14 proximate the cavity, or is scrubbed off of the insulated cavity during touch-up (e.g. via a belt driven rotary scrubber) and falls onto the floor 14.

FIG. 2 illustrates a pair of insulated wall cavities 17, numerous open cavities 19 not yet insulated, and open wall cavity 5 in the process of being insulated. Each of these open cavities is vertically extending and is defined between a pair of elongated studs (wooden or metal) 21 within the residential dwelling. Vertically extending studs 21 are supported by elongated horizontal studs 23. After the cavities are insulated and excess insulation is scrubbed off to make the exterior insulation surface flush with the studs (e.g. see cavities 17), the cavities are closed by attaching drywall or wall board to the studs over the insulation in a known manner. Please note that the back sides of wall cavities 5, 17, and 19 are closed via exterior weather siding, sheathing, plywood, or the like 18. Sheathing, plywood, or the like 18 is attached via nails or screws to the other side of studs 21 and 23, and functions to support the fiber as it is blown into the cavity (i.e. the rear surface 18 of each open wall cavity prevents the blown/sprayed fiber from exiting the rear of the cavity during application).

Figure 3:
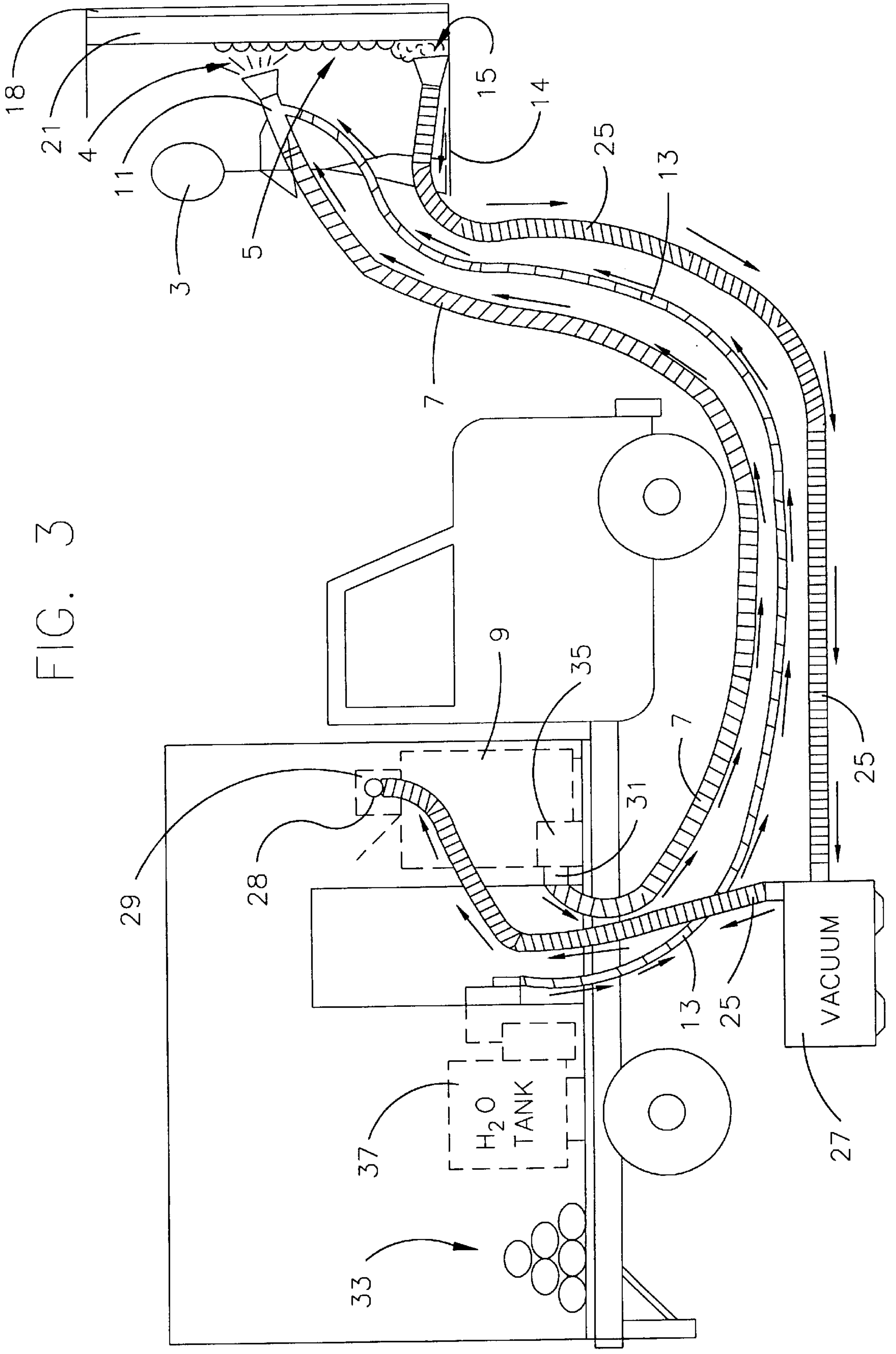
FIG. 3 is a schematic illustrating an insulation blowing/spraying system according to an embodiment of this invention, this embodiment being similar in certain respects to that shown in FIG. 1.

Turning now to the fiber recovery or recycling subsystem as shown in FIGS. 1–3. This recycling subsystem includes return hose or tube 25, vacuum 27 for sucking up waste or scrubbed off fibers 15 from the floor 14 of the dwelling, and collector device 29 mounted vertically above hopper 9. Collector device 29 is mounted at an elevation vertically above, and over top of, the open input of fiber hopper 9. According to certain embodiments, collection box or device 29 may be mounted directly to the top of hopper 9 via rigid brackets 30. Vacuum 27, or an equivalent vacuuming cyclone separator or other suction device, may be located exterior the truck as shown in FIGS. 1 and 3, or alternatively may be located inside of the vehicle proximate collector device 29 and hopper 9.

Vacuum 27 causes waste or overspray fibers 15 to be sucked into return hose 25 and be directed back toward the vacuum and hopper 9. From the return hose 25, the recovered insulation fibers (e.g. fiberglass or cellulose) are received in cavity 53 (see FIG. 4) defined within the housing of collector device 29. Once in cavity 53, the recovered fibers are distributed and fall downward due to gravity through an output hole(s) or aperture(s) in the bottom of collector device 29 and back into hopper 9 where the recycled fibers from device 29 intermix with virgin fiber/adhesive mixture. Hopper 9 has an open top. The mix of recycled and virgin insulation/adhesive in hopper 9 is then forwarded through airlock 31 into blow hose 7 and forwarded toward the cavity or cavities (5,17, and 19) to be insulated.

Referring to FIGS. 1–3, a typical operation of the illustrated embodiments of this invention utilizing fiberglass insulation will now be described. First, storage area 33 within the vehicle is filled or loaded with bales or bags of virgin fiberglass insulation mixed with dry redispersible powder adhesive. An operator fills up hopper 9 with dry virgin insulation/adhesive mixture from the bags or bales taken from storage 33. The virgin mixture from the hopper 9 is metered into blowing tube or hose 7 by way of airlock 31. Once in hose/tube 7, blower or fan 35 causes the mixture to be forwarded or carried by air through the hose 7 toward nozzle 11. Meanwhile, an adhesive activating liquid, such as water, is supplied from source 37 into hose 13, and is forwarded through liquid hose 13 toward nozzle 11. Proximate nozzle 11, the influx of water under pressure from hose 13 mixes with the fiber/adhesive mixture from hose 7, and together they are blown/sprayed into vertically extending open wall cavity 5. The water may contact the dry mixture either exterior the nozzle and hoses, or alternatively inside of the nozzle or hose housing proximate the outlet.

The adhesive, having been activated by the water from hose 13, causes a significant portion of the blown fiberglass mixture 14 to be retained within cavity 5 while a smaller portion is not retained and falls to the floor 14. After a number of open wall cavities have been filled with the fiberglass, a conventional powered scrubber is used to scrub off overspray, which falls to the floor. Thus, waste fibers 15 include fibers that were not originally retained within the cavity at which they were directed and/or fibers that have been scrubbed off in order to make the outer insulation surface flush with the exterior surfaces of studs 21 and 23 (e.g. see cavities 17).

Once a sizeable amount or pile of waste insulation 15 accumulates on the floor of the dwelling, it is time to recycle same. Vacuum 27 is turned on and the waste fibers 15 are sucked into an end of return hose 25 and forwarded to inlet 28 (i.e. nozzle 79 illustrated in FIGS. 5–6) of collector device 29. A portion of the air that is blown through hose 25 for carrying the recovered waste fibers is permitted to exhaust out of the top of collector device 29 as shown in FIG. 1 at 32 so as to reduce turbulent air flow within hopper 9. While some of this air is exhausted at 32 through the top of device 29, another portion of the air flows through cavity 53 and then downward toward hopper 9 along with the recycled fibers. The recovered fibers pass through inlet 28 and into cavity 53 defined within the housing of device 29, where they are substantially evenly distributed and fall 39 back into hopper 9. Once back in hopper 9, the recovered or recycled fibers mix with virgin fibers, and are together (along with the adhesive) metered into hose 7 via airlock 31 and blown back toward a wall cavity (or attic) to be insulated. While the system and method of this invention are especially adapted for blowing dry fiber/adhesive mixture together with an adhesive activating liquid into open wall cavities, the system and method may also be utilized for blowing loose-fill insulation into closed cavities or into attics (and recycling overspray or the like). Furthermore, the system may be used to blow a mixture of loose-fill insulation together with a wet adhesive carrying spray into open or closed wall cavities (or attics).

FIG. 3, in addition to FIG. 1, is another schematic of the insulation blowing or spraying system according to an embodiment of this invention. As illustrated, the system in FIG. 3 includes fiber blowing hose 7, water hose 13, return hose 25 for conveying waste fibers 15, conventional vacuum 27 for causing the waste fibers 15 to be sucked into hose 25 and returned to hopper 9, water tank/supply 37, loose-fill fiber storage area 33 for housing bags of virgin fiberglass/dry adhesive mixture, blower 35 for causing the dry fiberglass/adhesive mixture from hopper 9 to be blown through hose 7 toward the wall cavity to be insulated, and finally collector device 29 mounted on top of hopper 9 for receiving the waste fibers from hose 25 and redistributing same back into the hopper. As illustrated, hopper 9, collector device 29, virgin insulation storage area 33, blower 35, and water tank 37 may all be mounted on the wheeled vehicle. Vacuum 27 may either be mounted on the vehicle, or be placed on the ground or inside the dwelling exterior of the vehicle.

Figure 4:
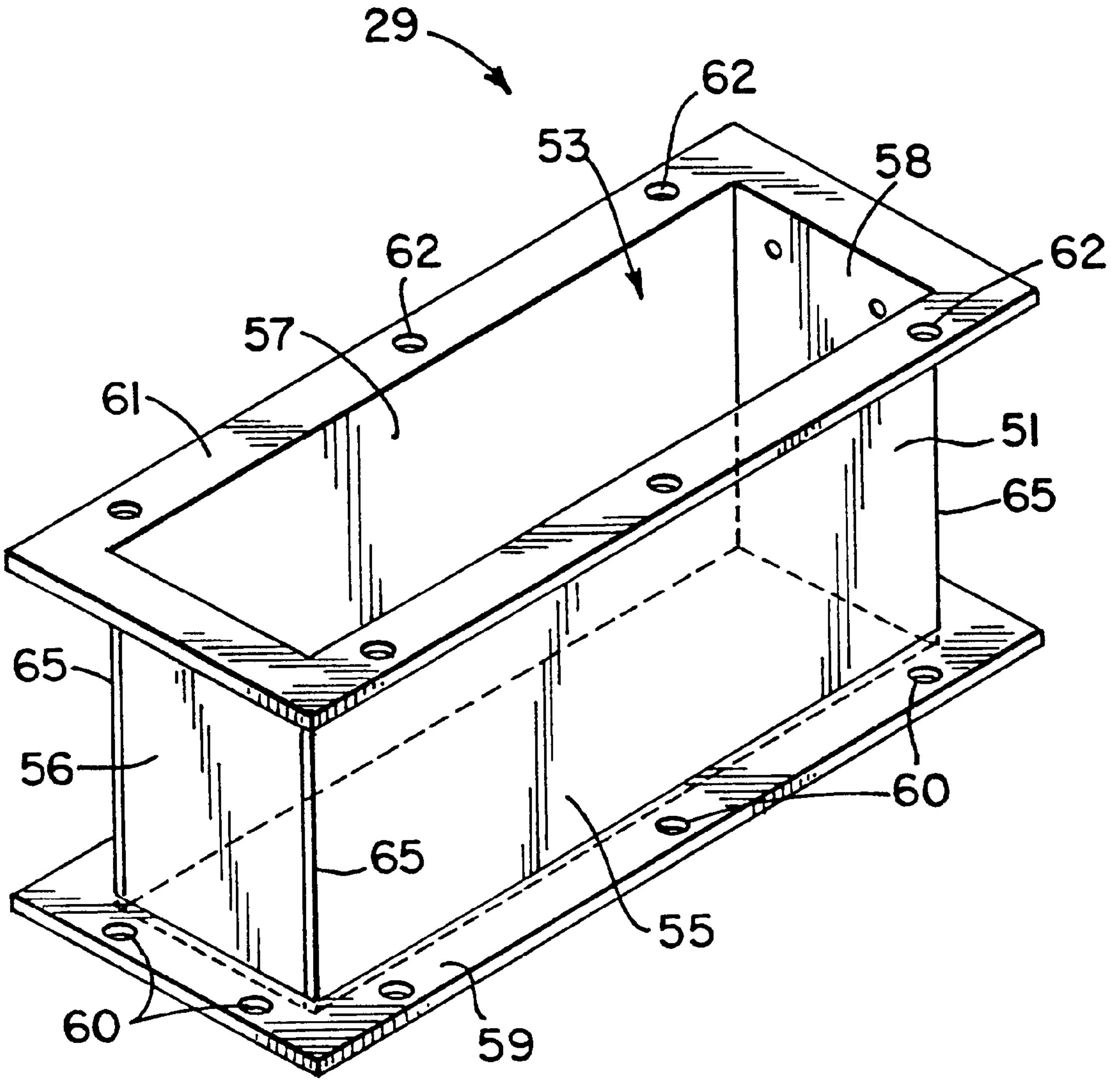
FIG. 4 is a perspective view illustrating a collector device according to an embodiment of this invention, this collector device adapted to be mounted at an elevation above the hopper so as to receive the waste fibers from the vacuum system and redistribute same back into the main hopper.

FIG. 4 is a perspective view of collector device 29 which is to be mounted on top of and above hopper 9, this view of device 29 not including the top wall or screen which will be described hereinafter. As shown in FIG. 4, device 29 is hollow and includes a substantially continuous sidewall 51 that defines and laterally surrounds fiber recovery cavity 53. Substantially continuous sidewall 51 may be rectangular in shape as shown in the FIG. 4 embodiment, so as to include four separate sidewall sections 55, 56, 57, and 58, respectively. Sidewall sections 55 and 57 are substantially parallel to one another, defining hollow cavity 53 therebetween, while sidewall sections 56 and 58 are also substantially parallel to one another. As shown, in this particular embodiment, sidewall sections 55 and 57 of substantially continuous side wall 51 are longer in length than sections 56 and 58. The four separate wall sections 55–58 may be formed of a singular metal sheet bent at the corners 65, or alternatively may be formed from four separate metal sheets welded together at corner areas 65, or alternatively may be formed of molded plastic. Instead of the rectangular shape illustrated in FIGS. 4–7, collector device 29 may alternatively be oval shaped, circular, triangular, etc., provided that there is a collection cavity that receives and redistributes the waste or recycled fibers 15 back into the main hopper 9.

Collector device 29 is mounted at an elevation above, and preferably over top of, hopper 9. Adjacent the bottom of device 29 is provided flange 59 that rims the periphery of the device. Flange 59 includes a plurality of mounting apertures 60 defined therein which allow device 29 to be mounted to the top of the hopper via metal brackets or the like. In a similar manner, adjacent the top of device 29 is located another peripheral flange 61 which includes a plurality of apertures 62 defined therein. Flange 61 in conjunction with apertures 62 permit top wall 70 (see FIG. 7) to be mounted to the top of device 29. The purpose of top wall 70 is twofold. Firstly, it prevents the waste fibers 15 entering into cavity 53 from blowing out of the top of device 29. Secondly, the top wall preferably includes at least one exhaust aperture defined therein for the purpose of allowing air from the return hose 25 to exhaust therefrom so as to reduce turbulence in hopper 9.

According to certain embodiments of this invention, the device 29 illustrated in FIG. 4 (not including the top wall) is made from four separate aluminum sheets (about 0.063 inches thick each), each of which ends up corresponding to one of the sidewall sections 55, 56, 57, and 58, and its respective upper and lower flanges. For example, two metal sheets of identical size are provided, one for making up sidewall section 55 and the other for sidewall section 57. The respective ends of each of these two sheets are bent for the purpose of forming the lower and upper flange sections 59 and 61, respectively. In a similar manner, a pair of smaller metal sheets are provided which end up defining sidewall sections 56 and 58. The ends of each of these two sections are also bent for the purpose of forming the lower and upper flange sections. Following the sizing of the four sidewall sections, the forming or apertures therein, and the bending of the ends thereof for defining the flange sections, the four sections are welded together at corner areas 65 (e.g. via spot welding) so as to form the device 29 shown in FIG. 4. The top wall is then affixed to the top of device 29 via apertures 62.

Figure 5:
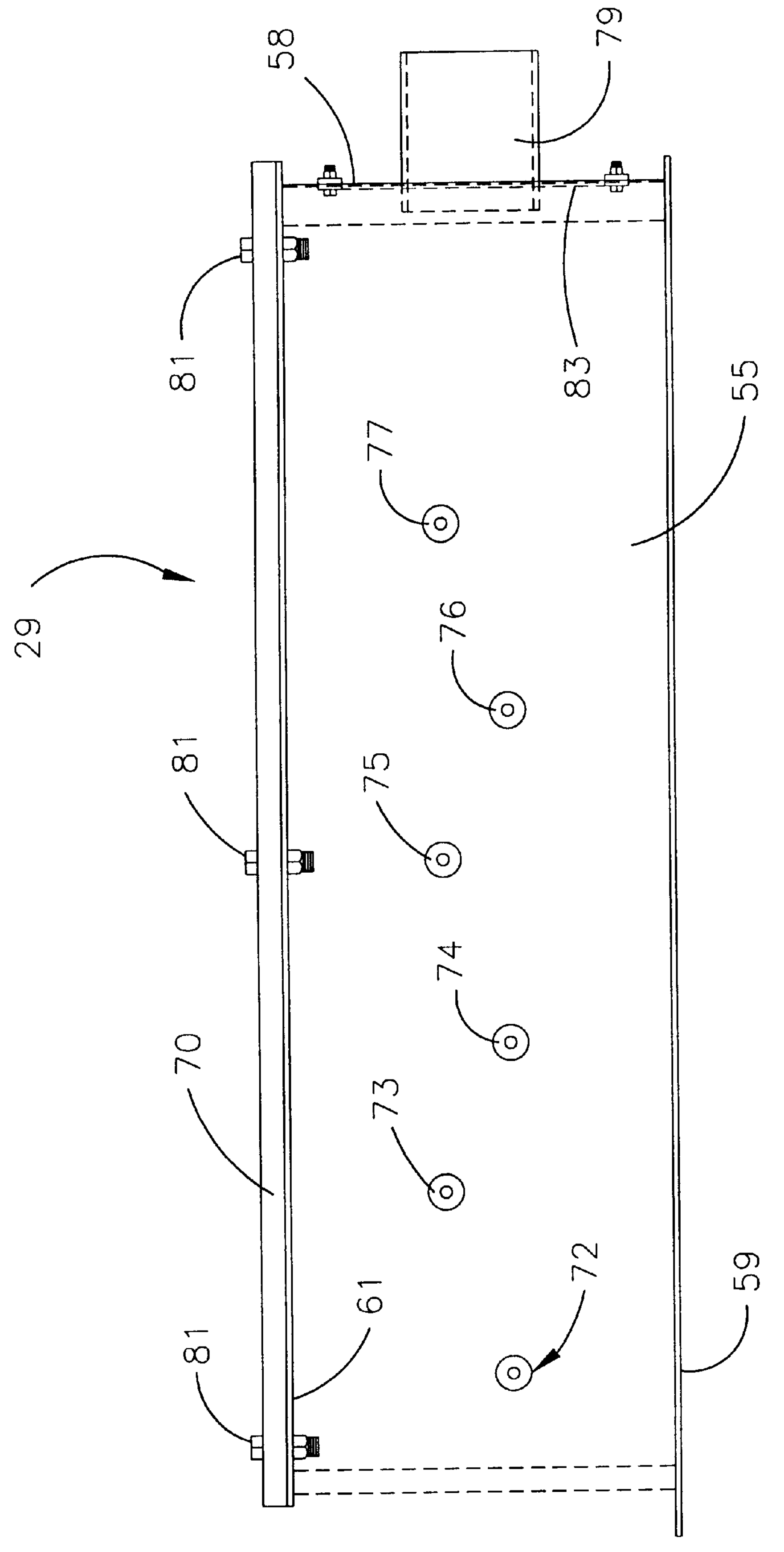
FIG. 5 is a side elevational view of the collector device of FIG. 4.
Figure 6:
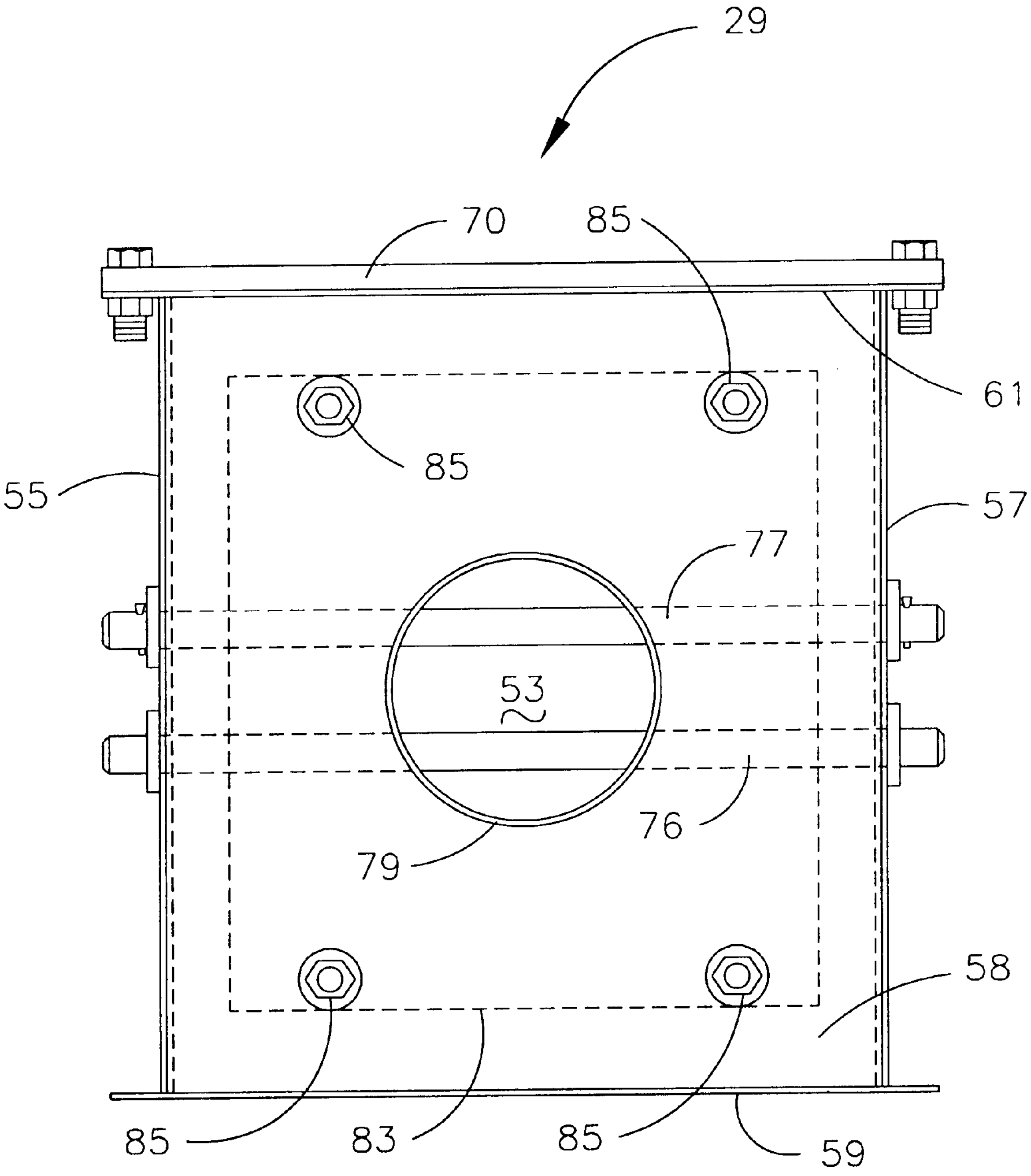
FIG. 6 is an end view of the collector device of FIGS. 4–5, this view illustrating the device from the end which includes the inlet nozzle.
Figure 7:
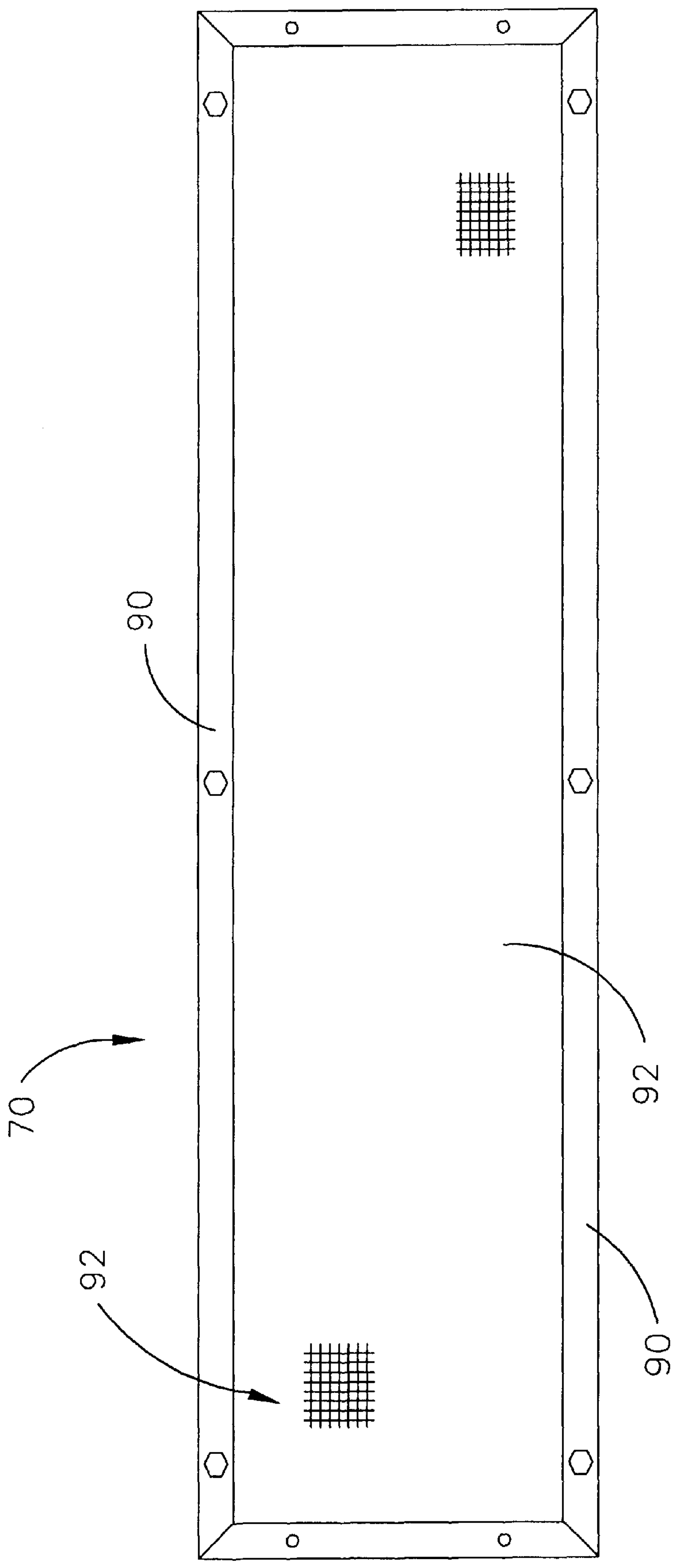
FIG. 7 is a top view of the top wall of the collector device of FIGS. 4–6.

FIGS. 5–7 illustrate collector device 29 from different view points. FIG. 5 is a side view of collector device 29, this view clearly illustrating sidewall section 55, bottom flange 59, top flange 61, top wall 70 mounted to the top of the device via flange 61, the ends of a plurality of distributing members 72–77 (e.g. rods) mounted to sidewall sections 55 and 57 and extending through cavity 53, and waste fiber inlet nozzle 79 that is affixed to device 29 at sidewall section 58. Top wall 70 is attached to upper flange 61 via fasteners (e.g. bolts and corresponding washers/nuts) 81 that extend through apertures 62.

Distribution members 72, 74, and 76 are located at an elevation that is lower than the elevation of members 73, 75, and 77. This different elevation associated with these two distinct groups of distributing members is provided for the purpose of allowing the waste fibers that enter into device 29 via inlet nozzle 79 to be evenly distributed within cavity 53 upon contacting members 72–77 so that the waste fibers then fall out of the cavity through the open bottom and into hopper 9. Members 72–77 may be mounted to the opposing sidewall sections 55 and 57 using cotter pins and washers.

FIG. 6 is an end view of device 29. As shown in FIGS. 5–6, annular nozzle 79 that extends outwardly from sidewall section 58 is connected to (e.g. welded) substantially planar metallic mounting section 83. Thus, the nozzle assembly, including sections 79 and 83, is mounted to sidewall section 58 by first locating the entire nozzle assembly within cavity 53 and then feeding annular nozzle 79 outwardly through a corresponding hole defined in sidewall section 58 until nozzle 79 protrudes outwardly from section 58 and substantially planar mounting section 83 comes to rest against the interior flat surface of section 58. Thereafter, the nozzle assembly (79 and 83) is affixed to sidewall section 58 via fasteners 85.

Still referring to FIGS. 5–6, when the waste fibers along with the adhesive they are mixed with are blown through hose 25 toward collector device 29, they enter into cavity 53 via nozzle inlet 79. As the waste fibers (that are sometimes wet due to the water that is applied to them at nozzle 11) enter into cavity 53, a substantial number of the waste fibers contact horizontally aligned rigid distribution members 72–77. As a result, the waste or recycled fibers within cavity 53 are more evenly distributed throughout the interior of the cavity and fall from cavity 53 directly into the open top end of hopper 9.

As discussed above, in certain embodiments, device 29 includes no bottom wall other than flange 59. Thus, the bottom of cavity 53 is open. Alternatively, a bottom wall may be affixed to flange 59, such a bottom wall including a plurality of large apertures defined therein for allowing the waste fibers to drop from device 29 into hopper 9.

According to certain embodiments of this invention, sidewall sections 55 and 57 may be approximately 47 inches in length, and about twelve inches in height. Sidewall sections 56 and 58 may be approximately 10⅝ inches wide, and about twelve inches in height. Also, nozzle 79 may protrude approximately four inches from sidewall 58, and the nozzle may have a diameter of about four inches.

FIG. 7 is a top view of top wall 70 adapted to be attached to flange 61. As illustrated, top wall 70 includes frame 90 that extends around the periphery of the top wall and supports screen 92. In this particular embodiment, the entire area interior of frame 90 is made up of screen 92. As discussed above, the screen section of the top wall 70 prevents the waste fibers from escaping cavity 53 through the top, and also allows air that is blown into cavity 53 from return hose 25 to exhaust upwardly away from hopper 9. This helps to reduce turbulent airflow within hopper 9, thereby keeping the fibers within the hopper and keeping dust to a minimum. According to certain embodiments, top wall 70 may be approximately 48.5 inches long from end-to-end, approximately 12.0 inches wide, and aluminum frame 90 of the top wall approximately 5/16 inch thick.

According to alternative embodiments of this invention, the screen section of top wall 70 may be replaced with a more rigid section that includes a plurality of air exhaust apertures defined therein. For example, screen section 92 may be replaced with a molded plastic section which includes a plurality of tiny apertures defined therein for both preventing the fibers from escaping the cavity and also allowing the air from the return hose to exhaust therethrough. Optionally, exhaust apertures may be provided in sidewall 51 of device 29, instead of or in addition to the exhaust apertures in the top wall.

Once given the above disclosure, therefore, various other modifications, features, or improvements will become apparent to the skilled artisan. Such other features, modifications, and improvements are thus considered a part of this invention, the scope of which is to be determined by the following claims.

I claim:

1. A fiber recovery and distribution device for use in an insulation blowing system that includes a fiber recovery or recycling subsystem, the fiber recovery and distribution device comprising:

substantially continuous sidewall means defining and laterally surrounding an interior fiber recovery cavity;

fiber inlet means defined in said sidewall means for receiving recovered insulation fibers from a return hose and allowing the recovered fibers to flow into said cavity;

a top wall disposed adjacent an upper edge of said sidewall means, said top wall including aperture means defined therein for enabling air flowing from the return hose into said cavity to at least partially exhaust upward through the aperture means; and outlet means located proximate a bottom of the device for allowing recovered fibers to fall from said cavity downward toward and into a hopper where the recovered fibers can intermix with virgin fibers.

2. The device of claim 1, wherein said top wall includes a screen section.

3. The device of claim 1, further comprising a plurality of elongated rigid distribution members connected to said sidewall means and located at least partially within said cavity, said distribution members for more evenly distributing the recovered fibers as they enter into said cavity via said outlet means, contacts said distribution members, and fall through said outlet means into the hopper.

4. The device of claim 3, wherein said sidewall means is rectangular in shape and includes four separate wall sections, two of said four wall sections being substantially parallel to one another.

5. A method of blowing a loose-fill insulation and dry adhesive mixture together with an adhesive activating liquid into a vertically extending open wall cavity, the method comprising the steps of:

feeding a virgin mixture of loose-fill insulation and dry adhesive into a hopper, and forwarding the virgin mixture from the hopper to a blow hose;

blowing the virgin mixture of loose-fill insulation and dry adhesive from the blow hose together with the adhesive activating liquid into the vertically extending open wall cavity so that a first portion of the blown mixture is retained in the cavity and a second portion of the blown mixture falls to a floor located beneath or proximate the cavity;

vacuuming up the second portion of the mixture from the floor and forwarding the vacuumed up second portion back toward the hopper through a return hose;

receiving the vacuumed up second portion from the return hose in a cavity defined within a collector housing that is mounted at an elevation vertically above the hopper, said collector housing having an inlet and an outlet defined therein;

allowing the received second portion to fall from the cavity, through the outlet, and into the hopper and intermix with virgin mixture within the hopper; and blowing virgin mixture, together with the recycled second portion that has fallen from the cavity into the hopper, through the blow hose and into an open wall cavity to be insulated.

* * * * *

UNITED STATES PATENT AND TRADEMARK OFFICE

CERTIFICATE OF CORRECTION

PATENT NO. : 6,045,298

DATED : Apr. 4, 2000

INVENTOR(S) : C. E. Butch Lytle

It is certified that error appears in the above-identified patent and that said Letters Patent is hereby corrected as shown below:

Claim 3, column 9, line 6, after "means," delete "contacts" and insert --contact--.

Signed and Sealed this

Sixth Day of March, 2001

Attest:

Nicholas P. Godici

NICHOLAS P. GODICI

Attesting Officer

*Acting Director of the United States Patent and Trademark Office*